United States Patent
Goller et al.

(10) Patent No.: US 6,802,403 B2
(45) Date of Patent: Oct. 12, 2004

(54) DISK-BRAKE DISK

(75) Inventors: Ralf Siegfried Goller, Bergamo (IT); Giovanni Paolo Pacchiana, Locate (IT)

(73) Assignee: Freni Brembo S.p.A., Bergamo (IT)

( * ) Notice: Subject to any disclaimer, the term of this patent is extended or adjusted under 35 U.S.C. 154(b) by 0 days.

(21) Appl. No.: 10/181,747

(22) PCT Filed: Jan. 29, 2001

(86) PCT No.: PCT/EP01/00920
§ 371 (c)(1),
(2), (4) Date: Nov. 12, 2002

(87) PCT Pub. No.: WO01/59318
PCT Pub. Date: Aug. 16, 2001

(65) Prior Publication Data
US 2003/0146059 A1 Aug. 7, 2003

(30) Foreign Application Priority Data
Feb. 9, 2000 (EP) .............................................. 00830092

(51) Int. Cl.[7] .............................................. F16D 65/04
(52) U.S. Cl. ............................. 188/251 M; 188/218 XL
(58) Field of Search ...................... 188/218 XL, 251 A, 188/251 M; 428/367

(56) References Cited

U.S. PATENT DOCUMENTS

| 3,867,491 A | 2/1975 | Marin |
|---|---|---|
| 3,932,568 A | 1/1976 | Watts et al. |
| 4,318,955 A | 3/1982 | Kulakov et al. |
| 5,230,946 A | 7/1993 | Fisher |
| 5,277,973 A * | 1/1994 | Yamamura et al. ......... 428/367 |
| 5,312,660 A | 5/1994 | Morris et al. |
| 6,273,222 B1 * | 8/2001 | Rebstock et al. ........ 188/251 A |

FOREIGN PATENT DOCUMENTS

WO    WO 00/61518    10/2000

* cited by examiner

Primary Examiner—Christopher P. Schwartz
(74) Attorney, Agent, or Firm—Kenyon & Kenyon (57) ABSTRACT

A disk brake disk comprises a braking band for cooperating with brake calipers in order to exert a braking effect on a vehicle. The braking band of one embodiment comprises a shaped body which extends about an axis of symmetry and is defined laterally by braking surfaces, and the shaped body is made of a composite material which, according to one embodiment, is produced by causing a mixture comprising bundles of filaments constituted substantially by carbon, arranged randomly and having dimensions no greater than 30 mm, to interact with silicon at a temperature high enough to bring about fusion of the silicon. According to this embodiment, the shaped body has a plurality of reinforcing fibers incorporated in the shaped body and extend around the shape fo the shaped body in a manner such as to deter the propagation of cracks.

17 Claims, 5 Drawing Sheets

DISK-BRAKE DISK

FIELD OF THE INVENTION

The invention relates to a disk brake disc.

In particular, the present invention relates to a disk-brake disk comprising a braking band for cooperating with brake calipers in order to exert a braking effect on a vehicle. The braking band comprises a body which extends about an axis of symmetry and is defined laterally by braking surfaces. The body can be produced by causing a mixture comprising bundles of filaments constituted substantially by carbon to interact with silicon at a temperature high enough to bring about fusion of the silicon.

The term "filaments constituted substantially by carbon" may include fibrous materials produced by pyrolysis of various products of synthetic origin, for example, polyacrylonitrile (PAN) or polysilazane, or of natural origin, for example, pitches or cellulose-based natural sources such as vegetable fibres and wood.

The term "bundles of filaments" may include groups of filaments variable from 3000 to 50000 units and having diameters of between 2 and 3 mm, associated with one another and impregnated with a resin, for example, polyurethane resin. The bundles are then broken up so as to have lengths of less than 30 mm and, finally, are arranged randomly in the mixture.

These randomly-arranged bundles of filaments are commonly defined on the basis of the number of units constituting the bundle, for example, 3K, 10K, 50K, etc.

BACKGROUND OF THE INVENTION

Composite ceramic materials are used in various applications which require good impact strength, compression strength and resistance to heat generated by friction, which characteristics cannot be ensured by purely ceramic materials because of their intrinsic fragility.

In particular, known composite ceramic materials for braking applications are produced by the interaction of silicon with a mixture comprising bundles of carbon filaments and additives at a temperature at which the silicon is in the fused state.

Bundles of filaments are used because a composite material with acceptable cohesion characteristics is generally produced at relatively low production costs.

According to the prior art, these composite materials can be prepared in the following manner: the bundles of filaments are mixed with an aggregating resin, pitches and other additives and the mixture is placed in a mould in which it is formed by heating and the application of a pressure to produce a shaped semi-finished product.

The semi-finished product is then subjected to a first firing in a furnace at a temperature such as to bring about carbonization or pyrolysis of the resin.

As a result of this firing, the semi-finished product acquires a degree of porosity because of the loss of volatile material at the carbonization or pyrolysis temperatures.

The fired semi-finished product is then subjected to a second firing in the presence of silicon at a temperature such as to bring about fusion of the silicon and infiltration thereof into the pores of the semi-finished product.

The infiltration of the silicon increases the cohesion of the bundles of carbon filaments and, at the same time, the fused silicon reacts partially with the carbon of the semi-finished product in the conditions of the second firing, forming silicon carbides which have the effect of improving the cohesion characteristics of the material.

The composite material prepared by the method described above is often used in the production of brake and clutch components for vehicles, particularly for disk brakes, by virtue of its good characteristics of compression strength and resistance to the heat generated by friction, and to wear.

In spite of the above-mentioned good characteristics, disk brake disks have the serious disadvantage that any cracks or fractures which may form in them as a result of thermal and/or compression stresses tend to propagate rapidly throughout the structure of this material, bringing about its disintegration.

The use of known materials for a vehicle's disk brake disks thus clearly leads to considerable risks to the user's safety.

It is desirable to have a disk brake disk that has structural and functional characteristics such as to overcome the disadvantages mentioned with reference to the prior art.

SUMMARY OF THE INVENTION

A disk brake disk is described that resists disintegration from crack propagation. The disk brake disk of one embodiment of the invention comprises a braking band for cooperating with brake calipers in order to exert a braking effect on a vehicle, the braking band comprising a shaped body which extends about an axis of symmetry and is defined laterally by braking surfaces, the shaped body being made of composite material which can be produced by causing a mixture comprising bundles of filaments constituted substantially by carbon, arranged randomly and having dimensions no greater than 30 mm, to interact with silicon at a temperature high enough to bring about fusion of the silicon, characterized in that a plurality of reinforcing fibers is incorporated in the shaped body and extend around the shape of the shaped body in a manner such as to prevent the propagation of cracks.

The present invention is based upon the surprising discovery that the incorporation of reinforcing fibers in a mixture comprising bundles of randomly-arranged filaments within the shaped body of the disk brake disk produces a disk of composite material with a shaped body which has good cohesion characteristics and at the same time can prevent the propagation of cracks through the entire shape when the disk is in use.

The reinforcing fibers extend, in the disk structure of composite material according to one embodiment of the invention, around its entire shape.

In an alternative embodiment of the invention, the reinforcing fibers are provided only in some regions of the disk, for example, in the regions in which cracks arise, as well as in regions affected by the crack-propagation paths, these regions being easily identifiable on the basis of structural calculations, for example.

In the case of an axially symmetrical structure, such as a disk brake disk, structural calculations show that the crack-propagation paths have the greatest probability of being arranged radially relative to the shaped body, propagating from the inside of the disk towards the outside to the extent of causing the disk to suddenly fail.

In a disk brake disk according to the present invention, the propagation of cracks is therefore deterred by arranging the reinforcing fibers, for example, around annular portions of the disk of increasing size.

It is important that the reinforcing fibers have satisfactory characteristics of cohesion to the other components of the composite material constituting the disk to prevent the entire structure from disintegrating in use, even in the absence of cracks or fractures.

Moreover, the reinforcing fibers should be substantially inert in relation to the components of the composite material and should have an adequate ability to withstand the temperatures of pyrolysis and the infiltration of silicon in order to avoid their degradation during the preparation of the composite material.

In one specific embodiment the material of the reinforcing fibers is constituted by carbon fibers. In other embodiments of the invention other materials such as SiC, $Si_3N_4$, and TiC, as well as metals, for example, platinum, which can withstand the temperatures of the interaction with silicon, are used as the material of the reinforcing fibers.

The reinforcing fibers may be incorporated in the material in various ways. For example, the reinforcing fibers may be disposed in a plurality of bundles which are arranged in predefined directions.

These directions may be, for example, warp and weft directions, the bundles forming a fabric.

Alternatively, the reinforcing fibers may constitute a non-woven fabric, for example, a felt.

The reinforcing fibers may also constitute one or more layers within the shaped body of the disk.

The quantities of the components contained in the composite material shaped in the form of a disk may vary, as percentages by volume relative to the volume of the material, as follows:

bundles of filaments 40–70%, preferably 50–60%, binder 5–30%, preferably 15–25%, additives 0.5–20%, preferably 1–15%.

reinforcing fibers 4–30%, preferably 10–20%.

DETAILED DESCRIPTION

The present invention will now be described in detail for specific embodiments of the invention. These embodiments are intended only as illustrative examples and the invention is not to be limited thereto.

Figure 1:
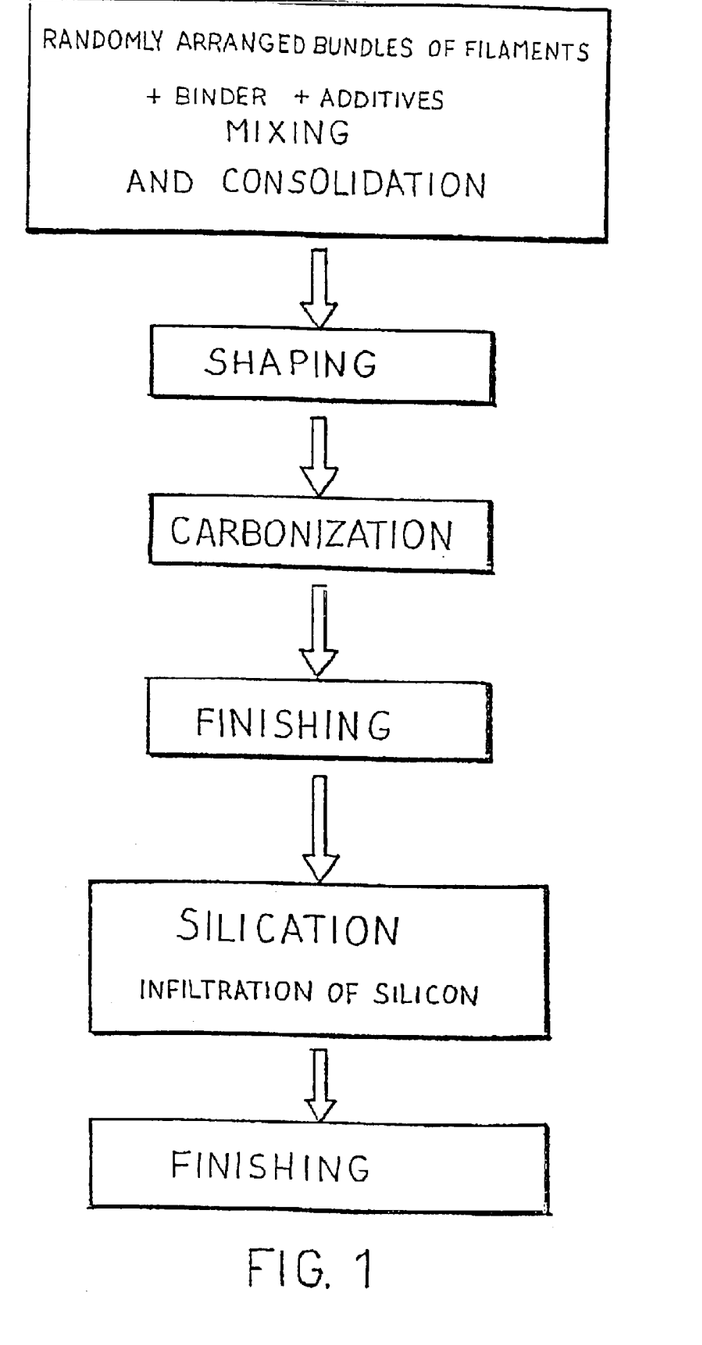
FIG. 1 is a block diagram showing the steps to prepare a disk brake disk according to the invention.

As can be seen from FIG. 1, the composite ceramic material from which the shaped body of the disk brake disk is made can be produced by means of the following method, which is given purely by way of example:

a) mixing a predetermined quantity of bundles of filaments constituted substantially by carbon and having lengths no greater than 30 mm with a predetermined quantity of an organic binder to give a mixture, b) placing the mixture in a mould of suitable shape and simultaneously incorporating in the mixture a plurality of reinforcing fibers which extend around the shape in a manner such as to prevent the propagation of cracks, c) forming the mixture including the reinforcing fibers to produce a semi-finished product, d) subjecting the semi-finished product to a first firing at a temperature such as substantially to bring about carbonization or pyrolysis of the organic binder, e) subjecting the fired, semi-finished product to a second firing in the presence of silicon at a temperature such as substantially to bring about fusion of the silicon and infiltration thereof into the semi-finished product to produce the shaped composite material.

In the method described above, the bundles of filaments may have diameters of from 0.1 to 2 mm, preferably from 0.3 to 0.5 mm.

The quantity of bundles of filaments contained in the mixture may vary from 50% to 80% by volume, relative to the volume of the mixture, and is preferably within the range of 60%–70%.

The bundles of filaments and/or the reinforcing fibers may be coated beforehand with a protective resin, preferably polyurethane resin, before being used in accordance with the method described above.

Alternatively, the bundles of filaments and the reinforcing fibers may be coated beforehand with the same organic binder which is used to prepare the mixture.

Greater cohesion of the material and a more compact product are thus obtained.

During the first firing of the semi-finished product, the resin and the organic binder carbonize, creating a protective layer on the bundles of filaments and on the reinforcing fibers, preventing them from disintegrating or even dissolving during the subsequent treatment with silicon.

The bundles of filaments and the reinforcing fibers thus maintain their original shape throughout the process, so as to produce a material with good characteristics of cohesion and strength.

The organic binder is a conventional binder which may be selected from the group comprising phenolic and acrylic resins, paraffin, pitches, polystyrenes, etc.

The binder is preferably selected from the group comprising pitches and phenolic resins.

The binder may be added to the mixture in any desired form, for example, in the solid, semi-liquid or liquid state, or in solution.

For example, phenolic resin may be added in the form of pellets, powder or granules.

The quantity of organic binder in the mixture may vary from 5% to 30% by volume relative to the volume of the mixture and is preferably within the range of 20%–26%.

The mixture may also contain other conventional additives used as fillers and, indirectly, for regulating the porosity and the density of the desired composite material.

These additives are constituted by particles of inorganic materials such as, preferably, graphite, silicon carbide, or metal carbides or nitrides, in powder form.

The quantity of additives in the mixture may vary from 0.7% to 23% by volume, relative to the volume of the mixture, and is preferably within the range of 9%–15%.

The mixing may be performed in a conventional manner and with conventional apparatus and the bundles of filaments will be arranged randomly in the various directions.

The reinforcing fibers may be incorporated in the mixture in various ways.

According to one embodiment of the invention, the incorporation is performed by the steps of:

i) arranging a first layer of the mixture around the shape of the mould, ii) adding, onto the first layer of mixture, the plurality of reinforcing fibers which extend around the shape in a manner such as to prevent the propagation of cracks, iii) arranging a second layer of the mixture on the first layer so as to cover the plurality of reinforcing fibers completely.

The reinforcing fibers may be added to the mixture in the form of a plurality of bundles arranged in predefined directions.

These predefined directions may be warp and weft directions in one embodiment of the invention, so that the bundles form a fabric. Alternatively, several bundles of reinforcing fibers combined or twisted together form a single warp or weft thread to form the fabric.

The fabric of one embodiment may comprise from 2 to 30 reinforcing fibers per cm, and in another embodiment the fabric may comprise from 5 to 8 fibers/cm.

In an alternative embodiment, the reinforcing fibers may form a non-woven fabric, for example, a felt.

The quantity of reinforcing fibers incorporated in the mixture depends on the required reinforcing-fiber content of the final composite material, this content being within the range of 4–30% by volume for one embodiment, relative to the volume of the material. In another embodiment a range of 10–20% is preferred.

Clearly, the above-described layering steps may be repeated a predetermined number of times so as to produce a multi-layered composite material in which each layer of reinforcing fibers is incorporated between two layers of mixture comprising bundles of filaments.

During the forming step, the mixture comprising the reinforcing fibers is heated in the mould to a temperature of from 80° C. to 180° C., preferably 100–120° C., and a pressure of between 0.1 N/cm$^2$ and 5N/cm$^2$, preferably 0.5–1N/cm$^2$ is applied thereto, for example.

The shaped and compacted semi-finished product thus obtained is removed from the mould and then subjected to a first firing so as to carbonize the organic binder (step d, pyrolysis).

This firing is performed in a conventional furnace, for example, at a temperature which depends substantially on the type of binder used and is generally within the range of 900–1200° C.

The firing is performed in the presence of a stream of inert gas such as nitrogen or argon and with an overpressure of 10–100 mbars, preferably 20–30 mbars.

The stream of inert gas also advantageously removes the gases which are liberated by the pyrolysis of the organic binder.

During this step of the method, the semi-finished product acquires a greater porosity, which is important in the subsequent firing since it allows the fused silicon to infiltrate therein.

The method may also comprise a step for machining the crude material or finishing the surface of the semi-finished product produced by the first firing of step d).

This enables any surface deformations of the semi-finished product to be removed by conventional apparatus so as to give it the desired shape.

The finishing step is preferably performed dry, for example, by means of diamonds, since the semi-finished product which, after the first firing, has acquired a degree of porosity, might disadvantageously absorb liquid substances if the finishing were preformed wet.

The semi-finished product, fired in accordance with step d), is subjected to a second firing in the presence of silicon (step e).

In order to perform the second firing, the semi-finished product, fired and possibly subjected to finishing, is inserted in the chamber of a container having a volume approximately twice that of the semi-finished product, the space formed between the semi-finished product and the container being filled with silicon which surrounds the semi-finished product. The quantity of silicon used is therefore that which is required to fill the pores of the semi-finished product, or a little more.

Pure silicon or an alloy of silicon and aluminium or copper in granular or powder form is used to fill the space.

The chamber may be in communication with the exterior by means of suitable holes for the outlet of the gases liberated during the firing.

After the silicon has been loaded, the container is inserted in a suitable, conventional furnace, heated to a temperature of 1400–1700° C., for example.

At these temperatures, the silicon melts (fuses) and infiltrates the pores of the semi-finished product (silication).

In one example embodiment, the firing is performed under partial vacuum at a reduced pressure of from 900 mbars to 300 mbars, preferably from 800 to 500 mbars.

Upon completion of the firing, the composite material is cooled, for example, with argon or, preferably, with nitrogen, so that the residual silicon solidifies in small spheres which are easy to recover from the container.

The disk of composite material according to the invention thus produced may possibly be subjected to surface finishing operations which may be performed dry or wet, in a conventional manner.

Clearly, the steps involving firing in a furnace, that is, the pyrolysis and silication steps, could take place in a single furnace, reducing production times and the complexity of the apparatus.

Figure 2:
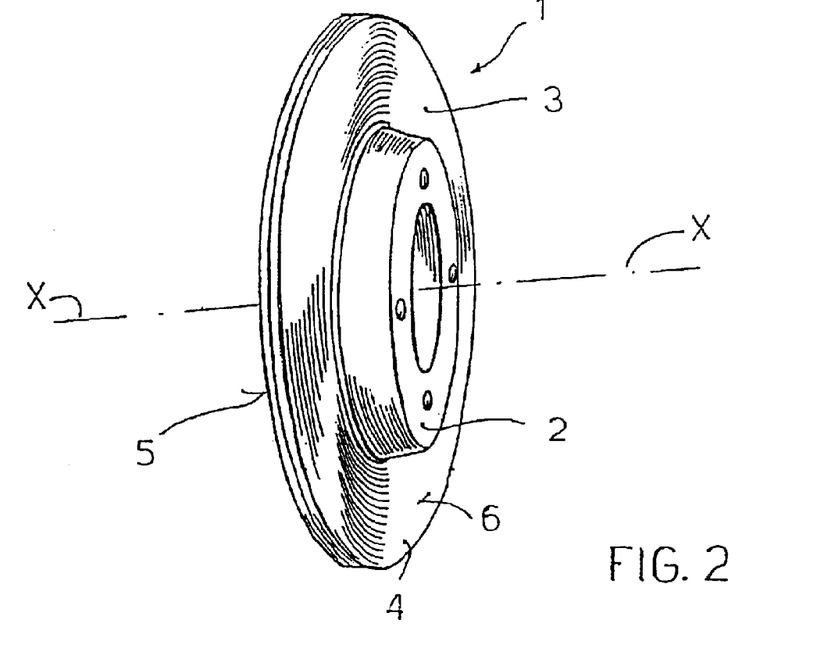
FIG. 2 is a perspective view of a disk brake disk according to one embodiment of the invention.

The material described above may be shaped directly as a disk brake disk 1 comprising a bell 2 for its connection to the support structure and a braking band 3, for example as illustrated by FIG. 2.

Figure 3:
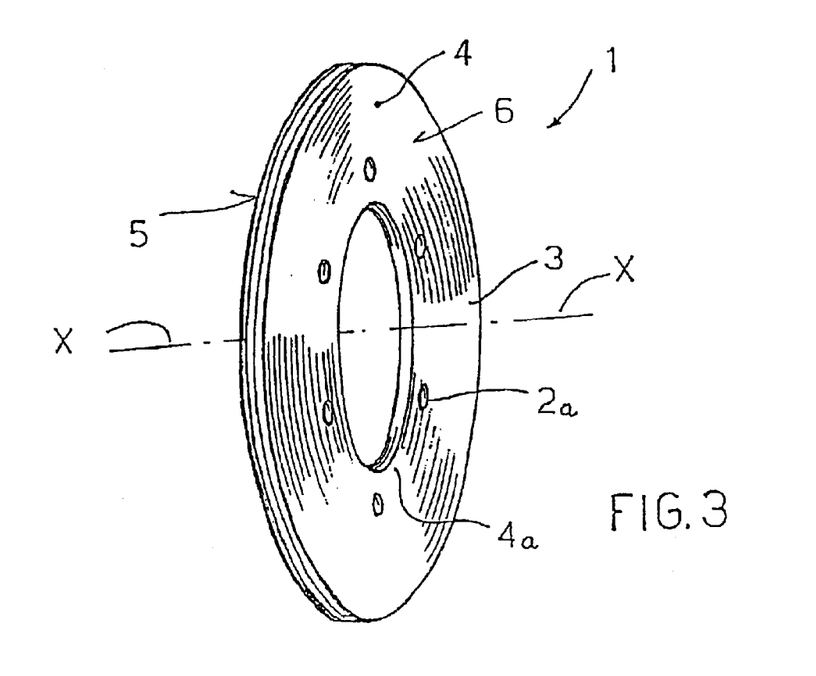
FIG. 3 is a perspective view of a braking band of a disk brake disk according to one embodiment of the invention.

Alternatively, the composite material is shaped as a braking ring or band 3 for a disk, to be fitted on a separable support bell made of the same material or of a different material such as, for example aluminum or steel, by means of a plurality of seats or holes 2a distributed uniformly around an inner annular portion 4a thereof, for example as illustrated by FIG. 3. According to a different embodiment, this inner annular portion 4a may also have a plurality of extensions or projections 4b having holes 2a for connection to the bell, for example as illustrated by FIG. 4.

The braking band 3 of one specific embodiment, has an annular shaped body 4 extending around an axis of symmetry and of rotation X—X. The shaped body 4 is defined laterally by braking surfaces 5 and 6 for cooperating with brake calipers in order to exert a braking effect on a vehicle. The braking surfaces 5, 6 are parallel to one another and a thickness of the shaped body 4, indicated by S in FIG. 4, is defined by them.

Figure 4:
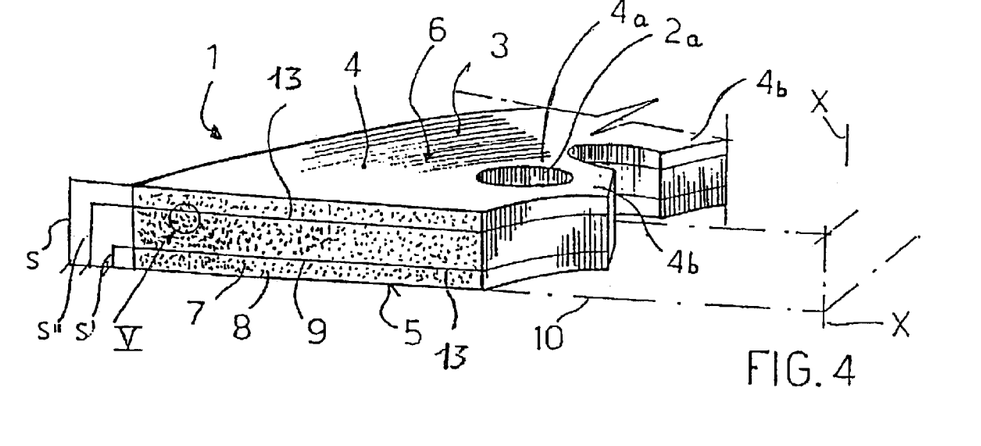
FIG. 4 is a partially-sectioned, perspective view of a detail of a braking band of a disk brake disk according to one embodiment of the invention.
Figure 5:
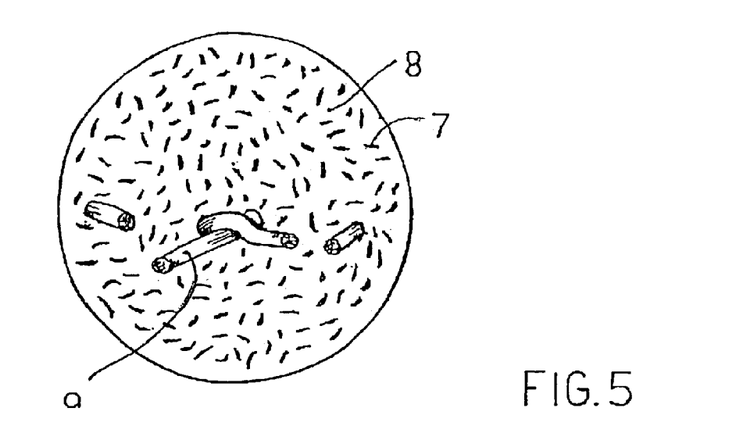
FIG. 5 illustrates a detail, indicated by the arrow V, of the braking band of FIG. 4, on a greatly enlarged scale.

As described above, the shaped body 4 comprises bundles of carbon filaments 7 with lengths of less than 30 mm, for example, of 5 mm, arranged randomly in the binder 8 constituted by the aggregating resin with additives, fired with interaction with silicon (FIGS. 4 and 5).

The above-described reinforcing fibers 9 are incorporated in the shaped body 4. For example, the reinforcing fibers 9 can be bundles of carbon fibers. According to one embodiment, the reinforcing fibers 9 are a plurality of bundles of reinforcing fibers disposed in a crossed or aligned arrangement in a single plane 10. In one particular example, the plurality of bundles of reinforcing fibers 9 are arranged relative to one another so as to form a reinforcing structure 11 (for example, FIGS. 6 to 11). For example, the reinforcing structure 11 can be a net-like reinforcing structure 12. The net-like reinforcing structure 12, according to one embodiment of the invention, is flat and annular so as to constitute at least one internal layer 13 of the shaped body 4 (such as illustrated in FIG. 4).

According to one embodiment, the net-like reinforcing structure 12 has meshes 14 formed by bundles of reinforcing fibers 9 twisted together.

Figure 6:
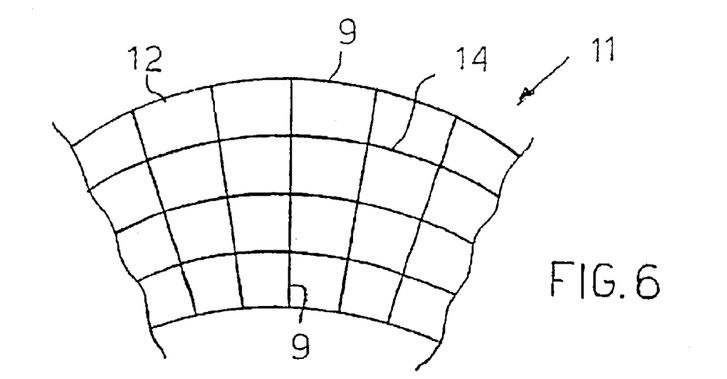
FIGS. 6 to 9 show, in plan, four different embodiments of a component of the braking band of FIG. 4.

According to one embodiment of the invention, in order to prevent the propagation of cracks in the braking band 3 or, in other words, in order to provide obstacles in the calculated or predefined crack paths, the net-like reinforcing structure 12 is formed by bundles of reinforcing fibers 9 arranged concentrically, associated with bundles of reinforcing fibers 9 arranged substantially radially (such as shown in FIG. 6).

According to one embodiment, the reinforcing structure 11 is arranged parallel to the braking surfaces 5, 6 (such as in FIG. 4). For example, the net-like reinforcing structure 12 is arranged in the centre of the shaped body 4 of the disk 1.

According to a further embodiment, a plurality of reinforcing structures 11, for example, a plurality of net-like reinforcing structures 12, are incorporated in the shaped body 4. For example, as shown in FIG. 4, the plurality of net-like reinforcing structures 12 can be arranged in the shaped body 4 at ⅓ (S') of its thickness (S) and at ⅔ (S") of its thickness (S).

The disk of composite material according to typical embodiments of the invention is distinguished by its optimal friction characteristics, hardness, bending strength, resistance to wear and to heat generated by friction, impact strength, and compression strength, which render it particularly suitable for use in braking applications. Furthermore, the disk of composite material according to the invention is very safe in use since any cracks or fractures which may arise in the disk during use do not lead to disintegration of the structure since the propagation of cracks is deterred by the reinforcing fibers incorporated in the material.

A further advantage of the disk of composite material according to the present invention is that it can also be produced easily and economically without requiring substantial additional costs or particularly expensive tooling.

In fact, it should be noted that the disk of composite material according to the present invention can be produced by conventional techniques applied to the production of the corresponding known composite materials.

Clearly, variants and/or additions to the embodiments described and illustrated above may be provided.

Figure 8:
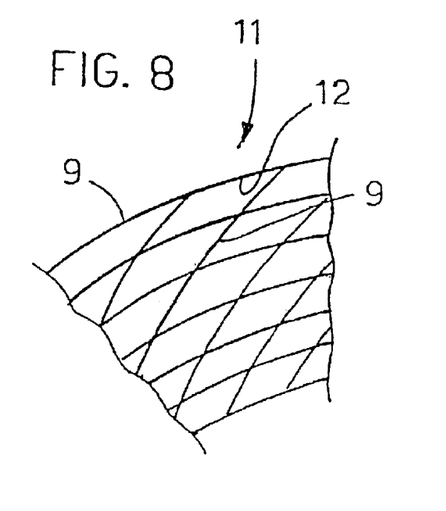

As an alternative embodiment to the arrangement shown in FIG. 6, the net-like reinforcing structure 12 is formed by bundles of reinforcing fibers 9 arranged concentrically and associated with bundles of reinforcing fibers 9 arranged transversely so as to be arranged along arcs of circles or spirals (such as illustrated by FIG. 8).

Figure 7:
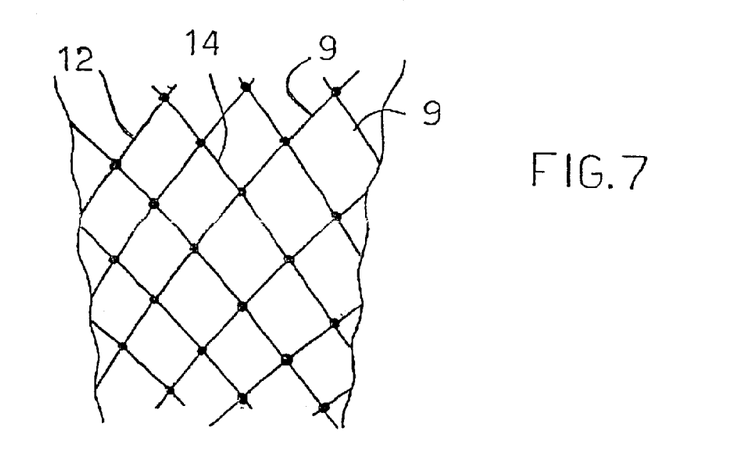

According to one embodiment, the bundles of reinforcing fibers 9 constituting the net-like reinforcing structure 12 are knotted together at some or all of the geometrical intersection points (such as illustrated in FIG. 7).

Figure 9:
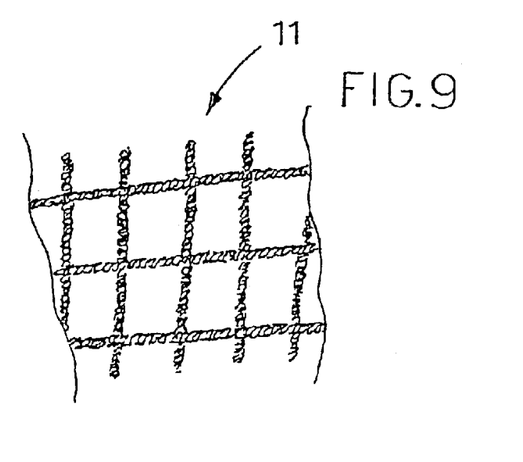

As an alternative to the arrangement shown in FIGS. 6 to 8, the reinforcing structure 11 comprises a plurality of bundles of reinforcing fibers 9 woven together (such as illustrated in FIG. 9).

Figure 10:
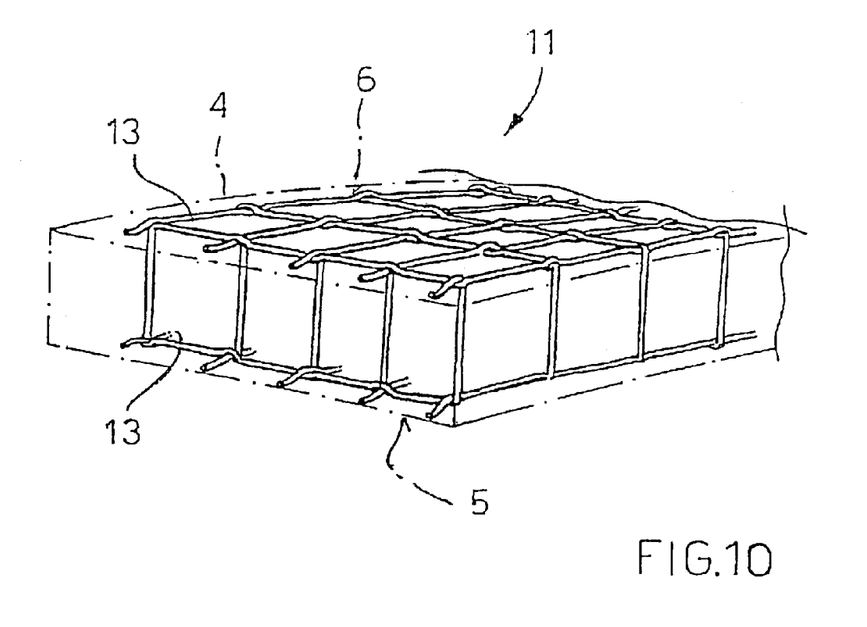
FIGS. 10 and 11 are partially-sectioned, perspective views of details of a component of a braking band according to a further embodiment.
Figure 11:
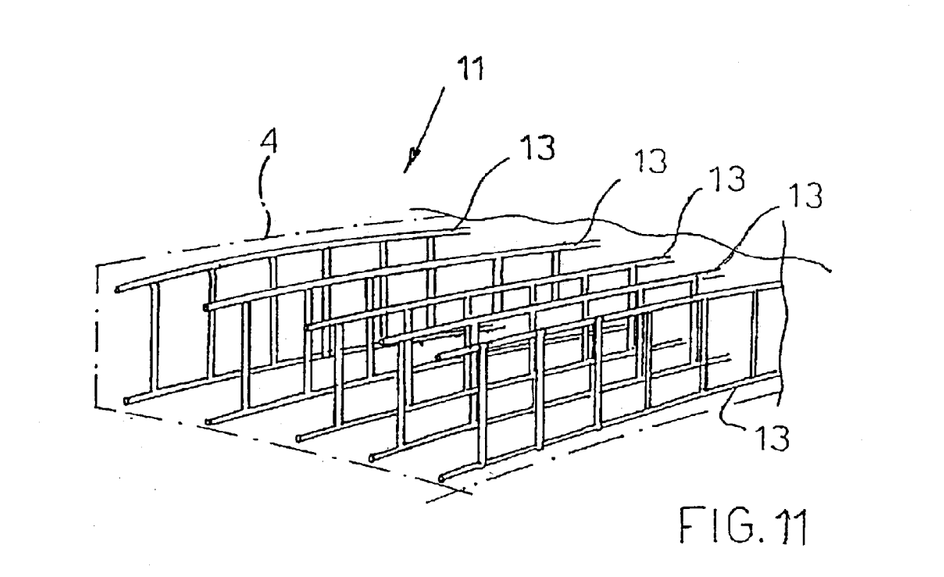

According to yet another embodiment, the reinforcing structure 11 is three-dimensional. For example, FIGS. 10 and 11 illustrate two embodiments of a three-dimensional reinforcing structure 12. In one specific embodiment, a plurality of bundles of reinforcing fibers 9 is interlaced or interwoven to form several layers 13 to be arranged parallel to the braking surfaces 5, 6. The layers are connected to one another transversely by a second plurality of bundles of reinforcing fibers 9, for example, at the points of intersection of the bundles constituting the layers 13 (such as illustrated in FIG. 10). Alternatively, layers 13 can be arranged transversely relative to the braking surfaces 5 and 6 or, in other words, layers formed by bundles of reinforcing fibers 9 mutually crossed, interlaced or interwoven to form concentric rings. When these layers 13 are incorporated in the shaped body of the disk, they divide the potential crack-propagation lines into portions or sections so as to deter cracks from propagating further than the distance between two successive layers 13.

As an alternative to the three-dimensional reinforcing structure, it is possible to incorporate in the shaped body of the disk a plurality of reinforcing fibers or bundles of reinforcing fibers associated with one another to form a non-woven fabric which extends through the entire extent of the shaped body so as to be arranged across or, in other words, to block the potential crack-propagation paths.

In order to satisfy contingent and specific requirements, one of ordinary skill in the art may apply to the above-described embodiments of the invention many modifications, adaptations and replacements of elements with other functionally equivalent elements without, however, departing from the scope of the invention.

What is claimed is:

1. A disk brake disk comprising:
    a braking band for cooperating with brake calipers in order to exert a braking effect on a vehicle, the braking band including:
    a shaped body which extends about an axis of symmetry and is defined laterally by braking surfaces, wherein said shaped body is made of a composite material, said composite material including:
    an organic binder;
    a mixture of bundles of filaments arranged randomly and being no greater than 30 mm in length; and
    a plurality of reinforcing fibers extending around said shaped body in a manner such that crack propagation is deterred, wherein:
    said binder is made porous by pyrolysis,
    the mixture including the reinforcing fibers has a structure obtained by causing the mixture to react with molten silicon, and said bundles of filaments and said reinforcing fibers substantially include carbon.

2. The disk brake disk according to claim 1, wherein said plurality of reinforcing fibers are disposed in a plurality of bundles arranged in predefined directions.

3. The disk brake disk according to claim 1, wherein said bundles of reinforcing fibers are mutually arranged relative to one another in a manner such as to form a net-like reinforcing structure.

4. The disk brake disk according to claim 3, wherein said net-like reinforcing structure has meshes formed by the bundles of reinforcing fibers twisted together.

5. The disk brake disk according to claim 3, wherein said net-like reinforcing structure is formed by bundles of reinforcing fibers arranged concentrically with the axis of symmetry of said shaped body and associated with bundles of reinforcing fibers arranged substantially radially relative to said shaped body.

6. The disk brake disk according to claim 3, wherein said net-like reinforcing structure is formed by bundles of reinforcing fibers arranged concentrically with the axis of symmetry of said shaped body and associated with bundles of reinforcing fibers arranged transversely relative to said concentrically arranged bundles of reinforcing fibers in a manner such as to form arcs.

7. The disk brake disk according to claim 3, wherein said net-like reinforcing structure has a plurality of geometrical intersection points at which said bundles of reinforcing fibers are knotted together.

8. The disk brake disk according to claim 3, wherein said bundles of reinforcing fibers are interwoven to constitute the warp and weft of a fabric.

9. The disk brake according to claim 3, wherein said net-like reinforcing structure is arranged parallel to the braking surfaces.

10. The disk brake disk according to claim 3, wherein said net-like reinforcing structure is three-dimensional.

11. The disk brake according to claim 3, wherein said net-like reinforcing structure is disposed in the center of said shaped body.

12. The disk brake according to claim 2, wherein said plurality of reinforcing fibers include a non-woven fabric.

13. The disk brake according to claim 1, wherein said predefined directions are at least one of mutually crossed and mutually aligned.

14. The disk brake disk according to claim 1, wherein said bundles of reinforcing fibers are arranged in a single plane.

15. The disk brake according to claim 1, wherein said bundles of reinforcing fibers are mutually arranged relative to one another in a manner such as to form a plurality of net-like reinforcing structures.

16. The disk brake disk according to claim 15, wherein said net-like reinforcing structures define three portions of the shaped body.

17. The disk brake according to claim 1, wherein said organic binder includes one of phenolic resin, acrylic resin, paraffin, pitches, and polystyrenes.

* * * * *

UNITED STATES PATENT AND TRADEMARK OFFICE
CERTIFICATE OF CORRECTION

PATENT NO. : 6,802,403 B2
DATED : October 12, 2004
INVENTOR(S) : Ralf Siegfried Goller et al.

It is certified that error appears in the above-identified patent and that said Letters Patent is hereby corrected as shown below:

<u>Title page,</u>
Item [57], ABSTRACT,
Line 14, change "the shape fo the" to -- the shape of the --; and <u>Column 6,</u>
Line 8, change "preformed" to -- performed --; and <u>Column 8,</u>
Line 66, change "are" to -- is --; and <u>Column 9,</u>
Line 1, change "1" to -- 2 --.

Signed and Sealed this

Fifteenth Day of November, 2005

JON W. DUDAS
*Director of the United States Patent and Trademark Office*